US007506989B2

(12) United States Patent
Tomassetti et al.

(10) Patent No.: US 7,506,989 B2
(45) Date of Patent: Mar. 24, 2009

(54) HORN WITH INTERNAL LIGHT SIGNAL

(76) Inventors: Louis D. Tomassetti, 2745 E. Atlantic Blvd., #300, Pompano Beach, FL (US) 33062; Peter C. Tomassetti, 2745 E. Atlantic Blvd. #300, Pompano Beach, FL (US) 33062; Christian T. Scheindel, 172 Peavine Blvd., Bethel, VT (US) 05032

( * ) Notice: Subject to any disclaimer, the term of this patent is extended or adjusted under 35 U.S.C. 154(b) by 128 days.

(21) Appl. No.: 11/440,286

(22) Filed: May 24, 2006

(65) Prior Publication Data

US 2007/0272144 A1 Nov. 29, 2007

(51) Int. Cl.
*H04M 1/22* (2006.01)

(52) U.S. Cl. ..................... 362/86; 84/464 R; 84/464 A; 362/186; 116/3; 340/425.5

(58) Field of Classification Search ................... 362/86, 362/383, 276, 802, 186; 116/3, 137 R, 142 R, 116/112; 340/425.5, 326; 984/135, 136; 84/464 R, 464 A
See application file for complete search history.

(56) References Cited

U.S. PATENT DOCUMENTS 1,134,360 A * 4/1915 Walker .................. 340/815.69
2,893,344 A * 7/1959 Meyers ....................... 116/112
2,966,877 A * 1/1961 Konold et al. ............. 116/67 R
2005/0211855 A1 * 9/2005 Rayman ..................... 248/105

* cited by examiner

*Primary Examiner*—Jacob Y Choi
(74) *Attorney, Agent, or Firm*—Robert M. Downey, PA

(57) ABSTRACT

A horn device has a trumpet fixture with one or more internal lights. In one embodiment, the trumpet removably attaches to the valve portion of a canister containing a charge of pressurized gas or air. An actuator button on the top of the trumpet fixture is operable to open the valve assembly of the canister and release the pressurized gas or air through an interior passage of the trumpet fixture, causing a transparent or translucent diaphragm to vibrate, thereby producing a loud horn noise that is directed out of the open bell end of the trumpet. One or more light producing elements, such as electric lamps or LED's, a battery power source and an actuator switch device are housed within a rear chamber of the trumpet fixture. A button on the rear of the trumpet is pushed to control actuation of the light producing elements according to several modes of operation, including flash sequence and steady illumination. The produced light is directed forwardly, out of the open end of the trumpet. In an alternative embodiment, a battery powered electronic horn device is placed in the rear chamber to produce the horn noise. In a further embodiment, the trumpet fixture is transparent or translucent and light is transmitted omnidirectionally.

12 Claims, 7 Drawing Sheets

HORN WITH INTERNAL LIGHT SIGNAL

BACKGROUND OF THE INVENTION

1. Field of the Invention

The present invention is directed to portable horn devices and, more particularly, to a hand held, self-contained horn device that includes a trumpet fixture and one or more light emitting signaling devices in the trumpet.

2. Discussion of the Related Art

Hand held air horn devices of the type which operate with use of pressurized gas or air released from a canister are well known in the art. Air horns of this type normally have a trumpet fixture with an actuator button and a cone-shaped trumpet nozzle that is configured to produce a loud horn blast when the gas or air is released from the canister, through the trumpet fixture, and outwardly through the conical trumpet nozzle. These air horn devices are used extensively in the marine industry as navigational aids, often as one of several mandatory items required by U.S. Coast Guard regulations. Hand held pressurized gas or air operated horns are also used at various sporting events for signaling by officials during a particular event, as well as by fans to demonstrate enthusiasm.

Heretofore, hand held pressurized gas or air operated horns have typically comprised just a noise producing trumpet fixture attached to a canister. However, in many instances, there is a need for a light signaling device for use in conjunction with a horn signaling device. Specifically, in the marine industry, it is often necessary to signal with lights, particularly at night, to indicate direction of movement of a vessel, the type of vessel, and the nature of operation (e.g. towing vessel, fishing vessel with nets, etc.). Lights are also used on marine vessels to transmit a distress signal in an emergency. Additionally, light signals, such as flashing lights, are useful as a roadside emergency signal. The combination of flashing and/or steady lights on an air horn will enhance the overall usefulness of the air horn in various situations, both for signaling purposes as well as at festive activities.

Accordingly, there remains a need in the art for a hand held air horn device which includes a trumpet fixture removably attachable to the valve structure of a canister filled with a charge of pressurized gas or air, and further wherein the trumpet fixture provides a light signaling device.

OBJECTS AND ADVANTAGES OF THE INVENTION

Considering the foregoing, it is a primary object of the present invention to provide a hand held air horn device which includes one or more light generating sources within the trumpet fixture of the horn.

It is a further object of the present invention to provide a hand held air horn device having a trumpet fixture and at least one light producing element within the trumpet fixture for directing light outwardly from the trumpet fixture.

It is still a further object of the present invention to provide a hand held air horn device having a trumpet fixture and at least one light producing element within the trumpet fixture and being operable in several modes including at least one flash sequence mode and a steady illumination mode.

It is still a further object of the present invention to provide a hand held air horn device with a trumpet fixture and at least one light producing element within the trumpet fixture and wherein the light producing element is operable in at least one flash sequence mode in order to transmit an emergency distress signal.

It is still a further object of the present invention to provide a hand held air horn device with a trumpet fixture and a light generating source within a rear chamber of the trumpet fixture, and wherein the light generating source is structured and disposed to direct a focused beam of light in a forward direction outwardly from an open end of the trumpet fixture.

It is still a further object of the present invention to provide a hand held horn device with a trumpet fixture and a light generating source within a rear chamber of the trumpet fixture, and wherein the light generating source and trumpet fixture are structured and disposed to transmit light omnidirectionally through the rear cover, side walls and open end of the trumpet fixture.

It is still a further object of the present invention to provide a hand held air horn device that includes a trumpet fixture and an internal light generating source, and wherein the trumpet fixture and light generating source are structured and disposed to transmit light at an intensity (i.e. candle power or candela), direction, and flash sequence to satisfy federal regulations for use as an electric distress light for boats.

These and other objects and advantages of the present invention are more readily apparent with reference to the following detailed description taken in conjunction with the accompanying drawings.

SUMMARY OF THE INVENTION

The present invention is directed to an horn device that includes a trumpet fixture with one or more internal light generating elements. In several embodiments, the trumpet fixture is designed to removably attach to the valve portion of a canister containing a charge of pressurized gas or air. An actuator button on the trumpet fixture is operable to open the valve assembly of the canister, causing release of the pressurized gas or air through the trumpet fixture. As the pressurized gas or air flows through the trumpet, a transparent disc firmly held in a rear chamber is caused to vibrate. This produces a loud horn noise. The trumpet fixture is further provided with one or more light signal lamps. In a preferred embodiment, the light signal lamps are LED's and are powered by one or more batteries carried within the trumpet fixture. A button on the rear on the trumpet is pushed to control actuation of the light signal lamps according to several modes of operation, including flash sequence and steady illumination. The light from the one or more LED's is directed forwardly, out of the open end of the trumpet. The light beam, intensity and other characteristics may be in accordance with federal regulations, such as for emergency light signals and distress light signals for boats. Additionally, the actuator may be programmed to illuminate the one or more LED's according to a predetermined flash sequence, such as an SOS distress signal. The device can be hand held or clipped to a life jacket or floatation device for transmitting emergency light and sound signals. In another embodiment, the trumpet fixture is transparent or translucent and light is transmitted omnidirectionally. In a further embodiment, a battery powered electronic horn device is provided in the rear chamber of the trumpet to produce the horn noise.

BRIEF DESCRIPTION OF THE DRAWINGS

For a fuller understanding of the nature of the present invention, reference should be made to the following detailed description taken in conjunction with the accompanying drawings in which.

Like reference numerals refer to like parts throughout the several views of the drawings.

DETAILED DESCRIPTION OF THE PREFERRED EMBODIMENTS

Figure 1:
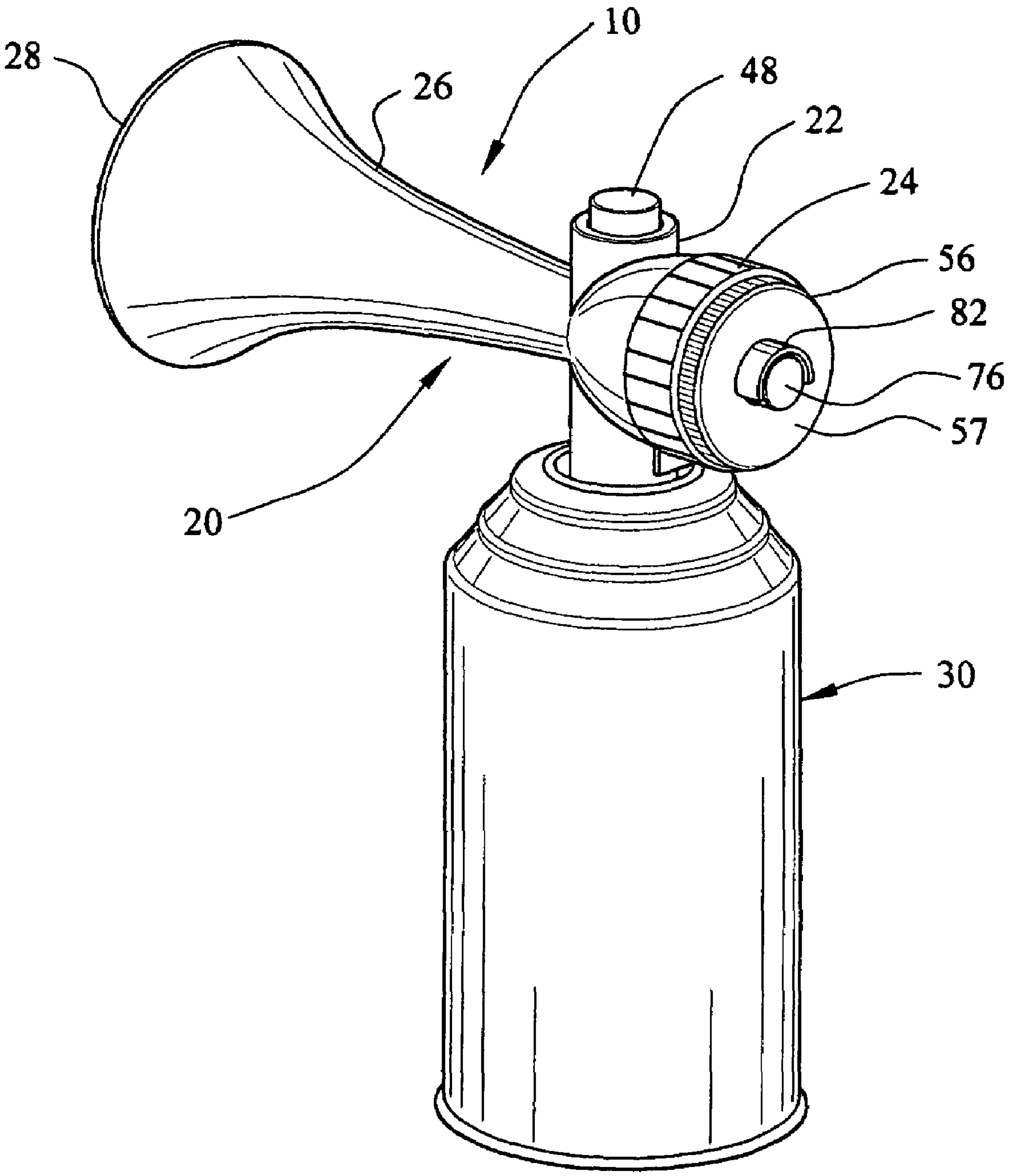
FIG. 1 is a side, rear perspective view of the air horn with light signal of the present invention, in accordance with a preferred embodiment thereof.
Figure 2:
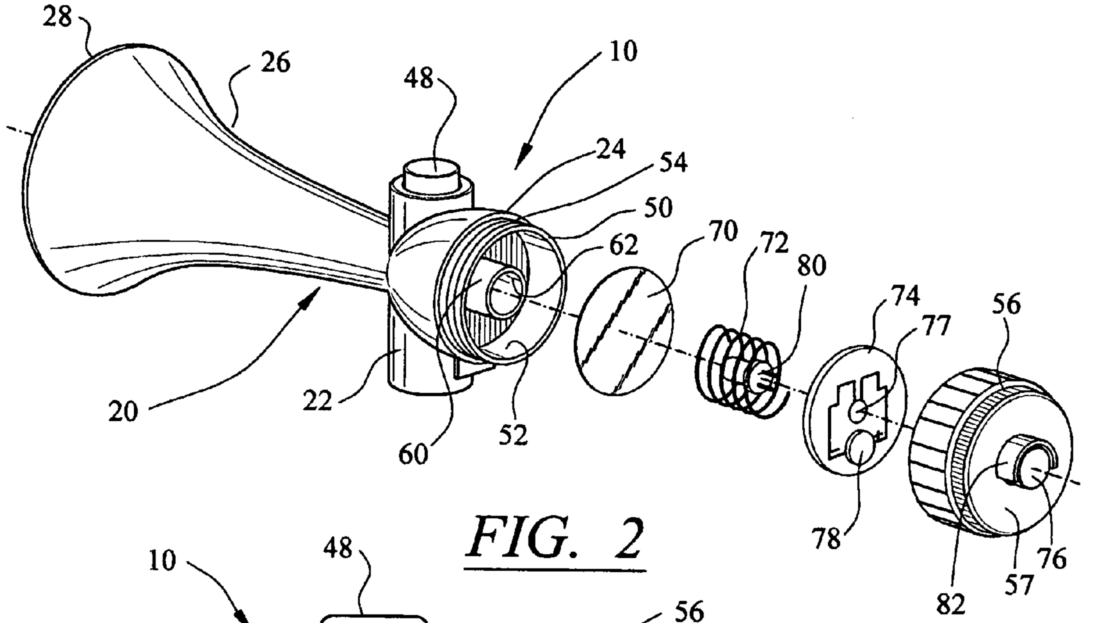
FIG. 2 is an exploded view showing the light generating assembly and transparent diaphragm removed from the back end of the trumpet fixture of the horn.
Figure 3:
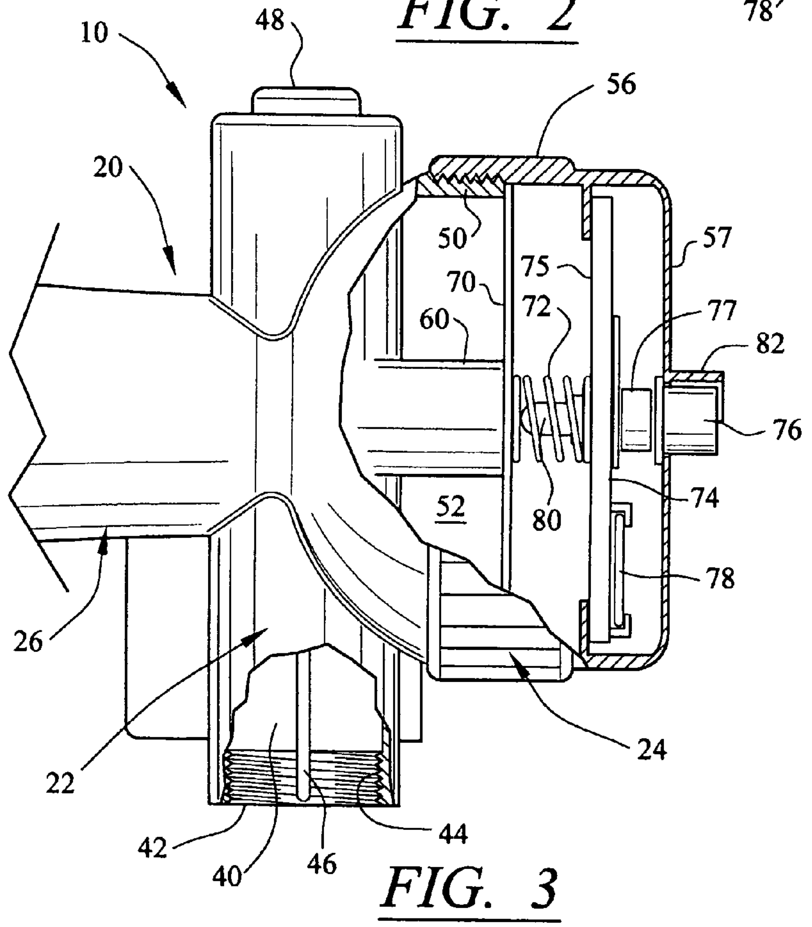
FIG. 3 is an isolated view, shown in partial cross-section, illustrating the light generating assembly in a rear chamber of the trumpet fixture, in accordance with the embodiment shown in FIG. 2.

Referring to the several views of the drawings, and initially FIGS. 1-3, the horn and light signal device is shown and is generally indicated as 10. In each of the embodiments of the invention, the device 10 includes a trumpet fixture 20 that has a central portion 22, a rear portion 24 and a forwardly extending bell shaped wall structure 26 with an enlarged open bell end 28.

In several embodiments of the invention, as shown in FIGS. 1-7, the trumpet fixture 20 is adapted for removable attachment to a canister 30 containing a charge of pressurized gas or air. More specifically, the central portion 22 of the trumpet fixture is defined by a vertical tubular passage 40 that has an open bottom end 42 with interior threads 44 for threaded attachment to a valve structure on the top of the canister 30. An actuator pin 46 within the vertical tubular passage aligns with a valve stem within the valve structure of the canister when the trumpet fixture 20 is attached to the canister 30. An actuator button 48 on the top of the central portion of the trumpet fixture is depressed to urge the actuator pin 46 downwardly and against the valve stem in the valve structure, causing the valve to open and release the pressurized gas or air contents upwardly through the vertical tubular passage 40 of the trumpet fixture.

Referring to the embodiments of FIGS. 1-3, the rear portion 24 of the trumpet fixture has a cylindrical collar 50 surrounding a rear chamber 52. An outer surface of the cylindrical collar is provided with threads 54 for screw-on threaded attachment of the rear cover 56 in order to enclose the rear chamber 52. A hub 60 extends rearwardly from the central portion and into the rear chamber. The hub 60 is concentrically aligned with the cylindrical collar 50 and terminates at an open end 62 within the rear chamber. The open end 62 of the hub 60 communicates with the hollow vertical interior passage 40.

In the embodiments of FIGS. 1-3 and 6, a transparent diaphragm 70 is held against the open end 62 of the hub 60 within the rear chamber with the use of a spring 72. The transparent diaphragm 70 is formed of a rigid material, such as a plastic composition, and is caused to vibrate when a forced flow of air is released from the canister, up through the trumpet fixture vertical tubular passage 40 and outwardly through the trumpet fixture. Vibration of the transparent diaphragm 70 creates a loud horn noise that is transmitted forwardly and out through the enlarged bell end 28 of the trumpet fixture.

Figure 4:
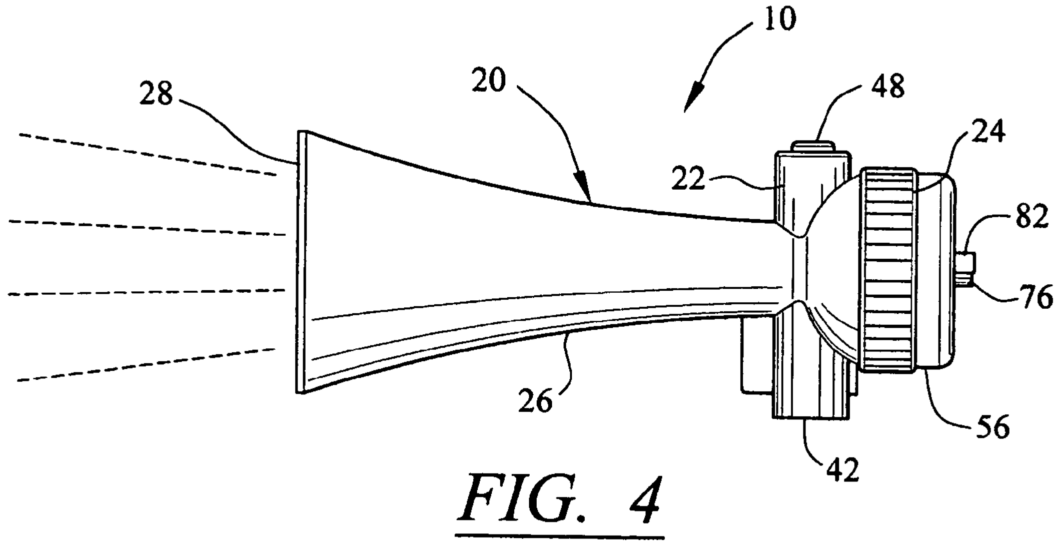
FIG. 4 is a side elevational view of the trumpet fixture, removed from the pressurized canister, and showing light from the internal light generating source being directed outwardly, in a directed beam, from the open bell end of the trumpet fixture.
Figure 5:
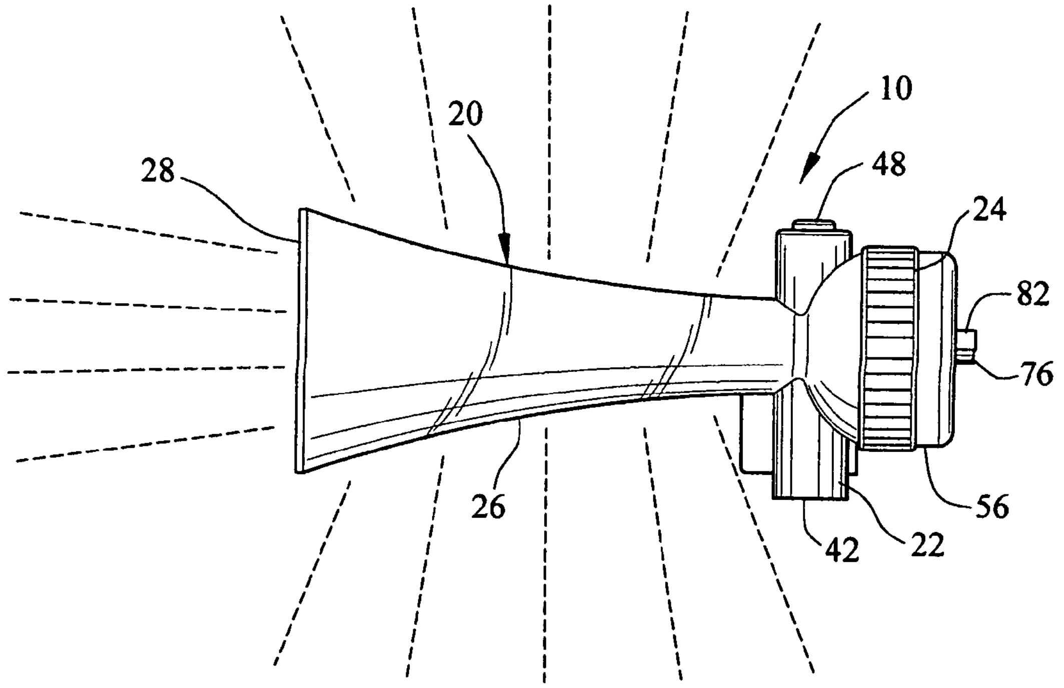
FIG. 5 is a side elevational view of a second embodiment of a trumpet fixture, wherein the trumpet fixture is formed of a transparent or translucent material, allowing light from the light generating source to be directed omnidirectionally through the back cover, side walls of the trumpet and out through the open bell end.
Figure 6:
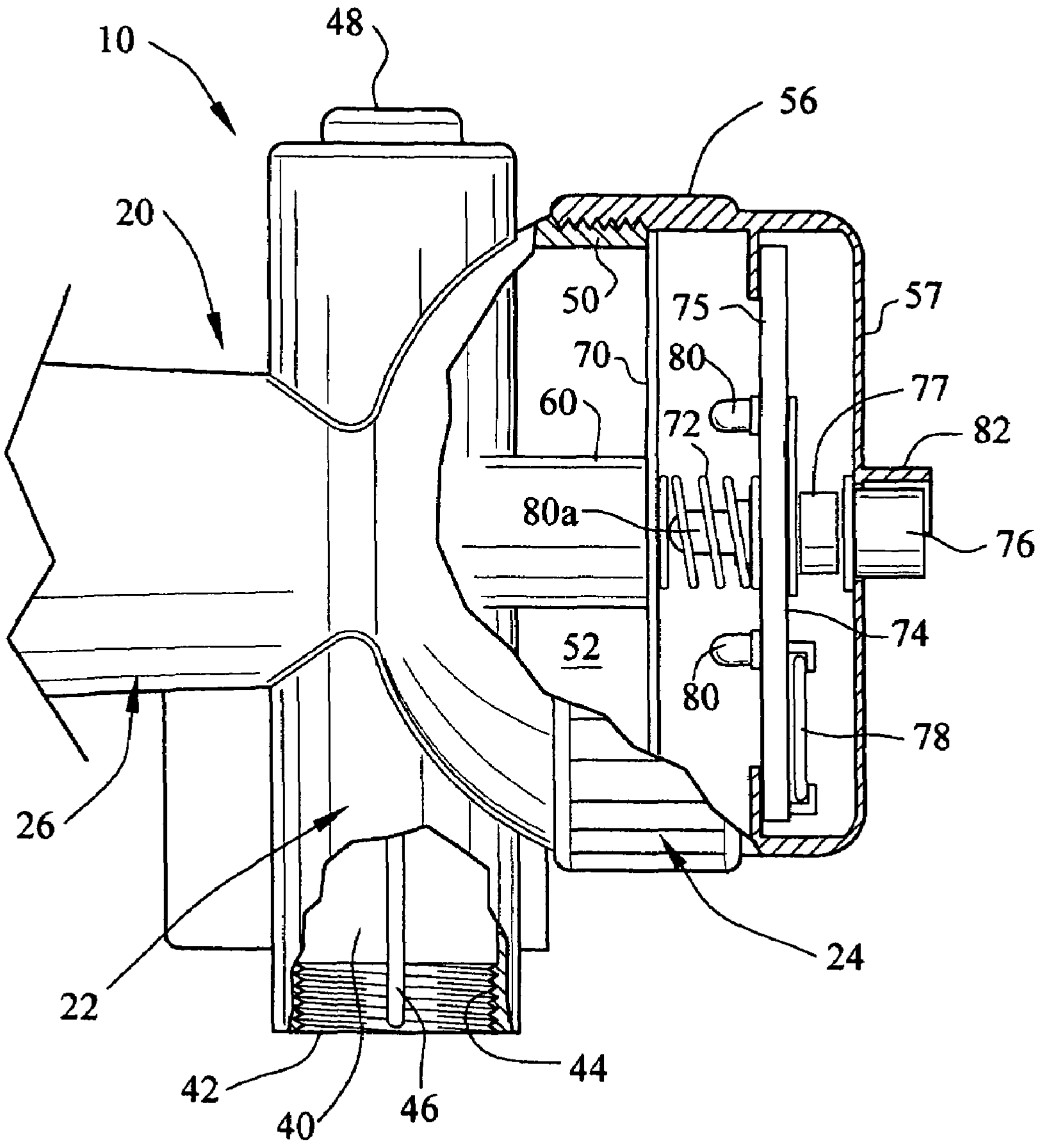
FIG. 6 is an isolated view, shown in partial cross-section, showing the rear chamber of the trumpet fixture with an arrangement of LEDs, providing multiple light generating sources in accordance with an alternative embodiment of the invention.

As seen in FIGS. 3 and 6, when the rear cover 56 is attached to the trumpet fixture, the spring 72 is partially compressed between the transparent diaphragm 70 and a circuit board 74 mounted within the interior of the cover 56. With the rear cover 56 fully attached to the threaded cylindrical collar 50, the spring 72 is compressed to a sufficient tension to urge the transparent diaphragm 70 against the open end 62 of the hub 60, while allowing the transparent diaphragm 70 to vibrate, separating slightly from the open end 62 of the hub, when a rush of compressed air travels through the trumpet fixture. The circuit board 74 houses electronic components, including a push button 76, momentary or spring-loaded switch 77 and a battery power source 78 for energizing an electrically powered light emitting source 80 fixed to a forward facing side 75 of the circuit board 74. In a preferred embodiment, the light emitting source 80 is one or more LED's. Operation of a push button 76 on the back side 57 of the rear cover 56 operates the switch 77 to energize the light emitting source 80. The circuit board 74 may be provided with programmable circuitry that allows for selective activation of the light emitting source 80 according to several modes of operation, including a steady illumination mode and at least one flash sequence mode. As seen in the embodiments of FIGS. 3 and 6, the light emitting source 80, such as an LED, is positioned centrally in alignment with the open end 62 of the hub 60. Thus, upon illumination of the light emitting source 80 by operation of the push button switch 77, light is transmitted through the transparent diaphragm 70 and through the open end 62 of the hub. The directed light continues through the bell shaped wall structure 26 of the trumpet fixture and outwardly from the open bell end 28, as depicted in FIG. 4. It should be noted that the light intensity, transmitted beam width, flash sequence, and other light transmission characteristics can be made to comply with federal regulations for use as an electric distress light signal and/or navigational lights for boats. Alternatively, the bell shaped wall structure 26 of the trumpet fixture 20 and the rear cover 56 can be made of a transparent or translucent material allowing the light to be emitted omnidirectionally, as depicted in FIG. 5. To prevent inadvertent operation of the actuation switch 77, a rigid half-round shield 82 may be provided over the push button 76 on the back side 57 of the rear cover. As seen in FIGS. 3 and 6, the half-round shield 82 extends beyond the actuation push button 76 to guard against accidental depressing of the actuation push button which might otherwise result in draining of battery power when the device is stored in a drawer or other cramped compartment. It is noted that the shield may be made as a full-round structure to completely surround the push button 76 or as an alternative structure that prevents accidental operation of the actuation switch 77.

In an alternative embodiment, as shown in FIG. 6, multiple light emitting sources 80 may be provided, such as a close cluster of LED's, on the forward facing side 75 of the circuit board 74, including a centrally located LED 80*a* positioned in alignment with the open end 62 of the hub 60.

Figure 7:
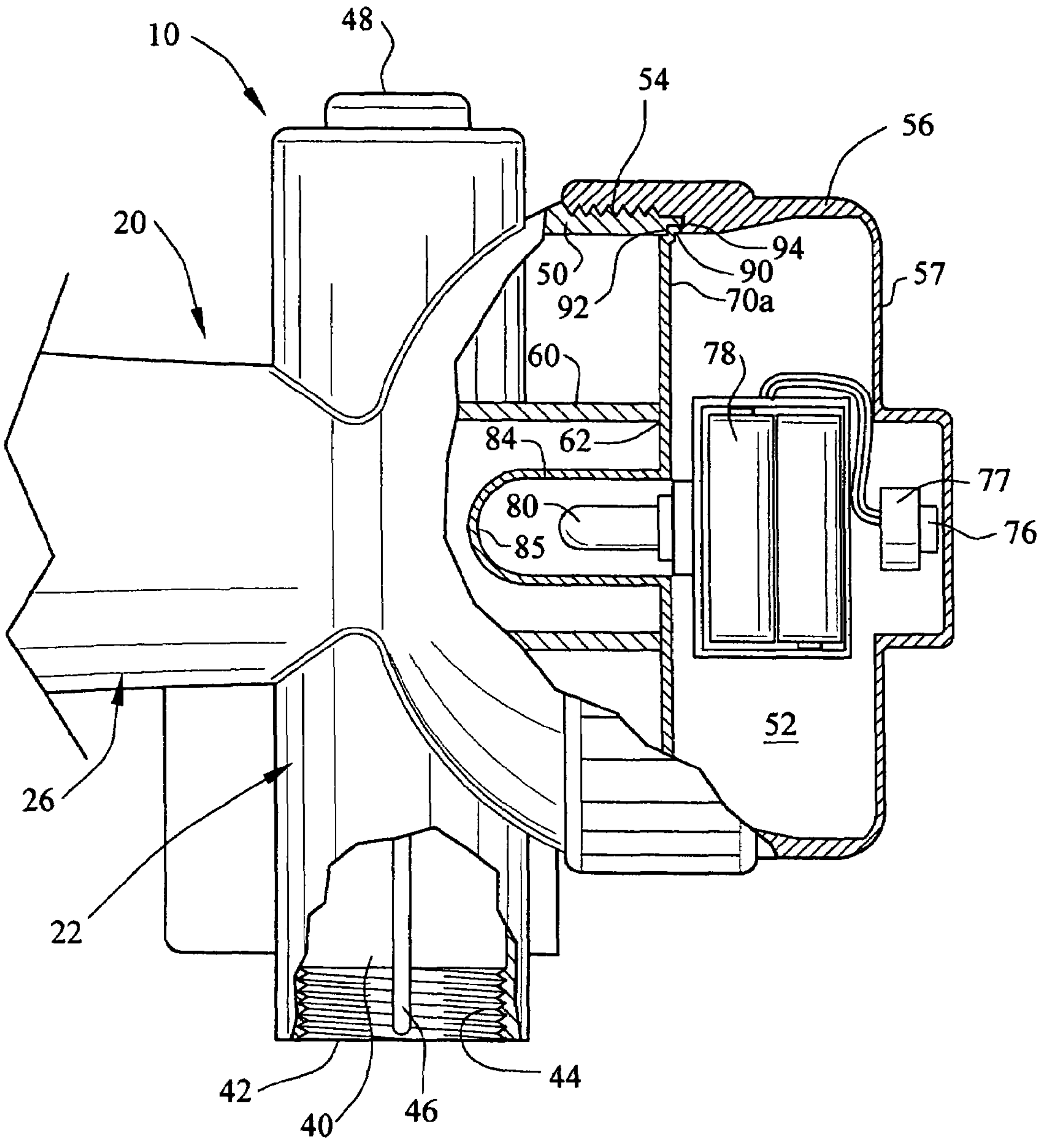
FIG. 7 is an isolated view, shown in partial cross-section, showing the rear chamber of the trumpet device with yet another embodiment of the light generating source, and with a transparent diaphragm having a central projecting pocket structure for accommodating the LED or other light producing element therein and an offset retaining rim about the periphery of the diaphragm that eliminates the need of a spring.
Figure 8:
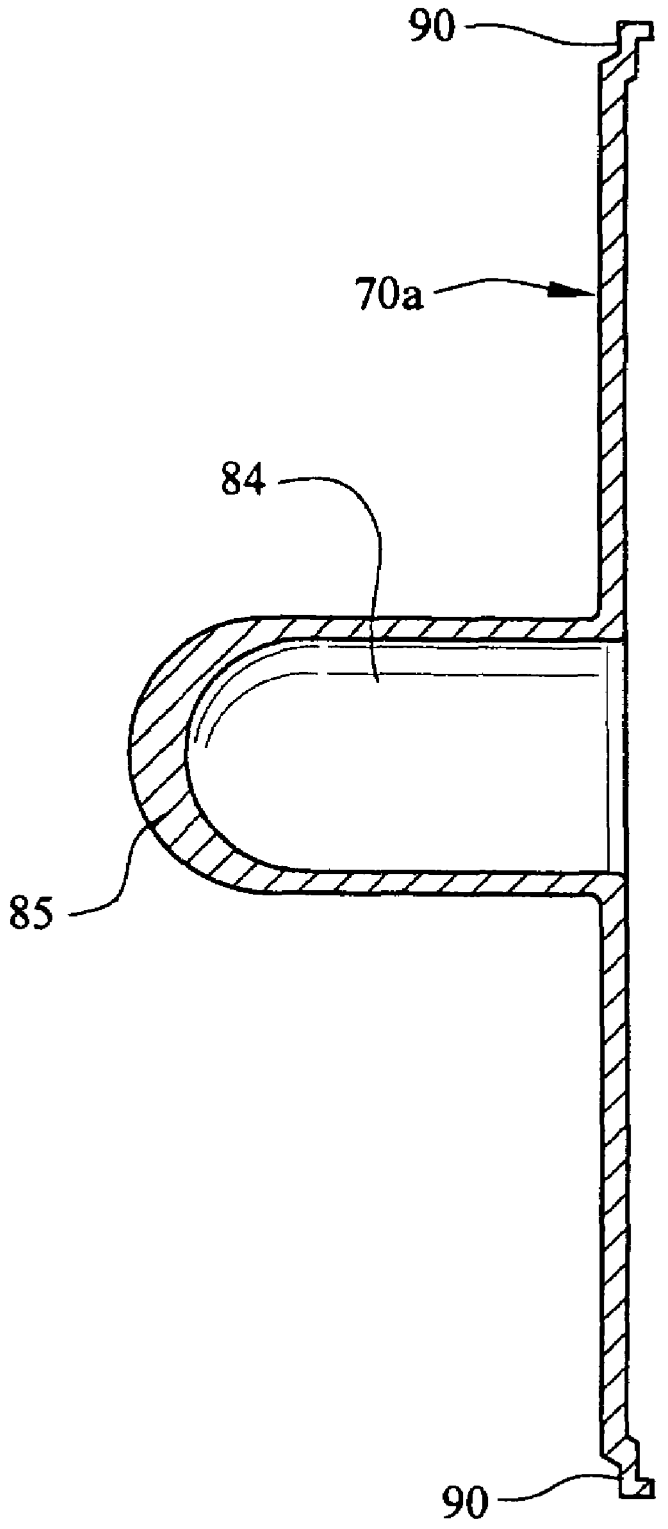
FIG. 8 is a side elevational view of the transparent diaphragm of the embodiment shown in FIG. 7.

In another embodiment of the invention, as shown in FIGS. 7 and 8, the transparent diaphragm 70*a* may be formed to include a forwardly protruding pocket 84 that extends within the hub 60. The pocket formed in the diaphragm is sized and positioned to receive the light emitting source 80 (e.g., LED), as seen in FIG. 7. The wall thickness of the pocket 84 may be formed to provide a lens for magnifying and/or focusing the light beam through the trumpet nozzle and outwardly from the open bell end 28. Specifically, the forward end 85 of the lens pocket 84 on the diaphragm 70*a* may be formed with an appropriate thickness and angled surfaces to refract light emitted from the LED 80 according to a desired beam width and light intensity. Naturally, the lens pocket 84 and preferably the entire diaphragm 70*a* is formed of a transparent material, such as a plastic composition. Much like the embodiments described above, the light emitting source 80 (e.g., LED) is powered by a battery source 78 and is actuated by a depressible push button 76 and switch 77. As an alternative design to the push button arrangement described above in connection with FIGS. 1-6, the actuating push button 76 in any of the embodiments described herein may be concealed within the rear cover 56 to provide water tight integrity. In this instance, the back side 57 of the rear cover 56, and particularly that area of the rear cover that surrounds the enclosed actuating push button 76, may be formed of a flexible, elastomeric material that allows the actuating push button to be depressed by applying inward pressure of the back side of the cover.

The transparent diaphragm 70*a* in the embodiment in FIGS. 7-8 is designed to be held against the open end 62 of the hub 60 without the use of a spring. As seen in FIGS. 7-8, the outer periphery of the diaphragm 70*a* is formed with an offset rim 90 that is pinched between a seat 92 on the end of the cylindrical collar 50 and an internal ring 94 formed within the rear cover 56. More particularly, upon tightening the rear cover 56 onto the threaded cylindrical collar 50, the internal ring 94 in the rear cover is moved against the offset peripheral rim 90 of the diaphragm which is seated against the end seat surface 92 of the cylindrical collar 50. This holds the transparent diaphragm 70*a* against the open end 62 of the hub and allows the diaphragm 70*a* to vibrate and separate slightly from the open end 62 of the hub upon the rush of air flow passing upwardly through the vertical tubular passage 40 and outwardly from the bell shaped end 28 of the trumpet fixture, thereby creating the loud horn noise.

Figure 9:
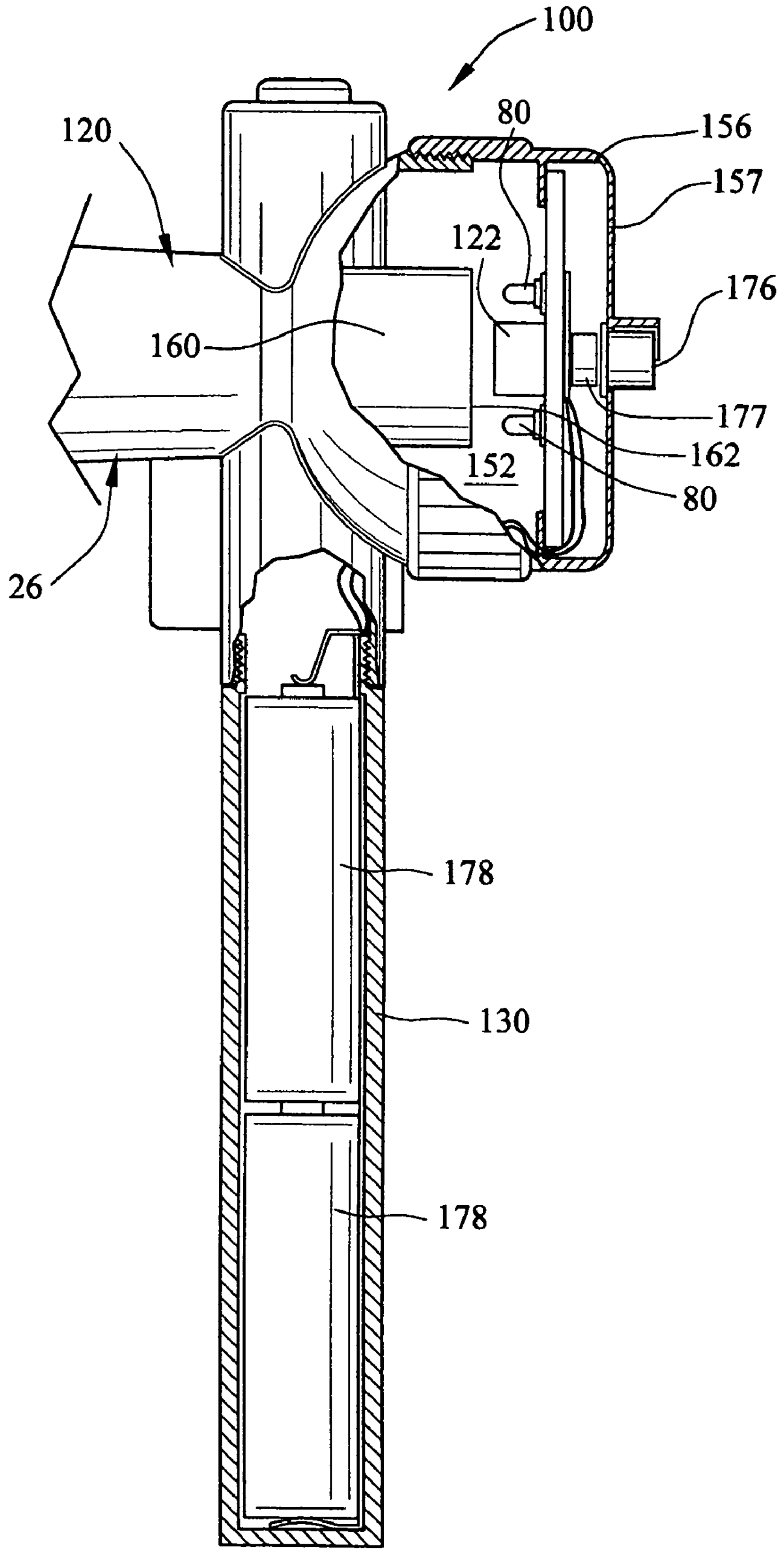
FIG. 9 is a side elevational view, in partial cross-section, illustrating a further embodiment of the invention that uses a battery powered electronic horn and one or more lights in the rear chamber of the trumpet fixture.

FIG. 9 illustrates an alternative embodiment of the horn and light signal device which operates entirely by battery power. Specifically, the device in FIG. 9 is generally indicated as 100 and eliminates the use of compressed air as the driving force to generate the horn noise. Instead, an electronic sound emitting device 122, such as a speaker, is provided within the rear chamber 152, behind or within the open end 162 of the hub 160. Additionally, one or more light emitting sources 80, such as LED's, are provided within the rear chamber 152 for directing light through the hub 160 and bell shaped structure of the trumpet 120, and outwardly form the open bell end and/or through the bell shaped wall structure 126 of the trumpet. As seen in FIG. 9, one or more batteries 178 are carried within a handle portion 130 which attaches to the trumpet fixture. The device may be made to allow replacement of the batteries. The batteries 178 provide power to a switch 177 which is actuated by a push button actuator 176 on the back side 157 of the rear cover 156. Programmable circuitry may be provided for selectively activating either or both the horn and light emitting sources according to several selected modes of operation, including a steady mode and a programmed sequence of activation. Specifically, the electronic sound emitting device 122 may be actuated in either a steady horn blast mode or, alternatively, in an intermittent, programmable horn blast sequence (e.g. short and/or long horn blast). Additionally, the electronic sound emitting device 122 may be operable to generate sounds of varying pitch and intensity to play a programmed musical tune or other sound arrangement. Likewise, the one or more light emitting sources 80 may be selectively actuated in either a steady illumination mode or a programmed sequence which may coincide with the sound emission sequence of the electronic sound emitting device 122. Any of the above described embodiments may be made to be water-proof.

While the invention has been shown and described in accordance with several preferred and practical embodiments, it is recognized that departures from the instant disclosure are fully contemplated within the spirit and scope of the present invention which is not to be limited except as defined in the following claims, as interpreted under the doctrine of equivalence.

What is claimed is:

1. A signaling device comprising:

a trumpet fixture having a central portion, a rear portion including a first open end within a rear interior chamber, and a forwardly extending bell shaped wall structure formed of a translucent material and terminating at an enlarged open bell end;

a sound producing mechanism within said rear interior chamber and rearward of said first open end of said trumpet fixture for producing at least one sound directed through said first open end and through said trumpet fixture;

said bell shaped wall structure of said trumpet fixture being structured and disposed for directing said at least one sound produced by said sound producing mechanism outwardly from said open bell end;

at least one electrically powered light emitting element within said rear interior chamber and rearward of said first open end of said trumpet fixture for transmitting light through said first open end and outwardly through said bell shared wall structure and said enlarged open bell end of said trumpet fixture; and at least one actuator control for selectively actuating said sound producing mechanism and said light emitting element.

2. The signaling device as recited in claim 1 further comprising:

a hub extending within said rear interior chamber and terminating at said first open end, and said first open end communicating with said enlarged open bell end; and wherein said at least one sound produced by said sound producing mechanism is directed through said first open end of said hub and out from said open bell end.

3. The signaling device as recited in claim 2 wherein said at least one light emitting element is structured and disposed for transmitting the light through said open end of said hub and out through said bell shaped wall structure and out from said open bell end.

4. The signaling device as recited in claim 3 wherein the light transmitted by said at least one light emitting element is focused in a beam and directed out from said open bell end.

5. The signaling device as recited in claim 3 wherein said at least one light emitting element is an LED.

6. The signaling device as recited in claim 1 wherein the light from said at least one light emitting element is transmitted omnidirectionally.

7. The signaling device as recited in claim 1 further comprising:

a plurality of said light emitting elements.

8. The signaling device as recited in claim 7 wherein said plurality of light emitting elements are LED's.

9. The signaling device as recited in claim 1 wherein said sound producing mechanism is an air powered horn.

10. The signaling device as recited in claim 1 wherein said sound producing mechanism is an electronic sound generating device.

11. A signaling device comprising:

a trumpet fixture having a central portion, a rear portion including a first open end within an enclosed rear interior chamber, and a forwardly extending bell shaped wall structure formed of a transparent material and terminating at an enlarged open bell end;

a sound producing mechanism within said rear interior chamber and rearward of said first open end of said trumpet fixture for producing at least one sound directed through said first open end and through said trumpet fixture;

said bell shaped wall structure of said trumpet fixture being structured and disposed for directing said at least one sound produced by said sound producing mechanism outwardly from said open bell end;

at least one electrically powered light emitting element within said rear interior chamber and rearward of said first open end of said trumpet fixture for transmitting light through said first open end and outwardly through said bell shaped wall structure and said enlarged open bell end of said trumpet fixture; and at least one actuator control for selectively actuating said sound producing mechanism and said light emitting element.

12. A signaling device comprising:

a trumpet fixture having a central portion, a rear portion including a first open end within an enclosed rear interior chamber, and a forwardly extending bell shaped wall structure formed of a translucent material and terminating at an enlarged open bell end;

a sound producing mechanism captivated within said enclosed rear interior chamber and rearward of said first open end of said trumpet fixture for producing at least one sound directed through said first open end and through said trumpet fixture;

said bell shaped wall structure of said trumpet fixture being structured and disposed for directing said at least one sound produced by said sound producing mechanism outwardly from said open bell end;

at least one electrically powered light emitting element captivated within said enclosed rear interior chamber and rearward of said first open end of said trumpet fixture for transmitting light through said first open end and outwardly through said bell shared wall structure and said enlarged open bell end of said trumpet fixture; and at least one actuator control for selectively actuating said sound producing mechanism and said light emitting element.

* * * * *